(12) United States Patent
Radford

(10) Patent No.: US 11,095,913 B2
(45) Date of Patent: Aug. 17, 2021

(54) SIGN LANGUAGE VIDEO ENCODING FOR DIGITAL CINEMA

(71) Applicant: Disney Enterprises, Inc., Burbank, CA (US)

(72) Inventor: Michael A. Radford, Los Angeles, CA (US)

(73) Assignee: Twentieth Century Fox Film Corporation, Los Angeles, CA (US)

( * ) Notice: Subject to any disclaimer, the term of this patent is extended or adjusted under 35 U.S.C. 154(b) by 0 days.

(21) Appl. No.: 16/757,700

(22) PCT Filed: Jan. 17, 2019

(86) PCT No.: PCT/US2019/014050
§ 371 (c)(1),
(2) Date: Apr. 20, 2020

(87) PCT Pub. No.: WO2019/143843
PCT Pub. Date: Jul. 25, 2019

(65) Prior Publication Data
US 2020/0275114 A1    Aug. 27, 2020

Related U.S. Application Data

(60) Provisional application No. 62/618,449, filed on Jan. 17, 2018.

(51) Int. Cl.
*H04N 19/46* (2014.01)
*H04N 19/176* (2014.01)
(Continued)

(52) U.S. Cl.
CPC ........... *H04N 19/46* (2014.11); *H04N 19/176* (2014.11); *H04N 21/2347* (2013.01); *H04N 21/2353* (2013.01); *H04N 21/242* (2013.01)

(58) Field of Classification Search
CPC .. H04N 19/46; H04N 19/176; H04N 21/2347; H04N 21/2353; H04N 21/242;
(Continued)

(56) References Cited

U.S. PATENT DOCUMENTS

| 6,327,272 | B1 * | 12/2001 | Van Steenbrugge ........................ G11B 20/10527 369/59.27 |
| 8,566,075 | B1 | 10/2013 | Bruner |

(Continued)

OTHER PUBLICATIONS

Written Opinion of the International Searching Authority for International Application No. PCT/US2019/014050, dated Apr. 15, 2019. pp. 1-9.

*Primary Examiner* — Richard A Hansell, Jr.
(74) *Attorney, Agent, or Firm* — Farjami & Farjami, LLP.

(57) ABSTRACT

A method and apparatus providing variable rate auxiliary video data in a digital cinema package is disclosed. The digital cinema package has primary video information and primary audio information carried on a plurality of fixed bit rate primary audio channels, each fixed bit rate primary audio channel represented by a sequence of audio channel data blocks. In one embodiment, the method comprises generating a chunk of the auxiliary video data, the chunk representing time duration $D_c$ of the auxiliary video data, generating an auxiliary video data block of $L_b$ length, and providing the auxiliary video data block as an audio channel data block of at least one of the fixed bit rate primary audio channels.

18 Claims, 6 Drawing Sheets

(51) Int. Cl.
*H04N 21/2347* (2011.01)
*H04N 21/235* (2011.01)
*H04N 21/242* (2011.01)

(58) Field of Classification Search
CPC ........... H04N 21/2365; H04N 21/4884; H04N 21/8547; H04N 21/8456
See application file for complete search history.

(56) References Cited

U.S. PATENT DOCUMENTS

| | | |
|---|---|---|
| 9,215,514 B1 | 12/2015 | Kline |
| 2006/0018254 A1* | 1/2006 | Sanders ............ H04N 21/23655 370/216 |
| 2009/0262238 A1* | 10/2009 | Hope ................. H04N 21/8583 348/441 |
| 2010/0254408 A1* | 10/2010 | Kuno ................. H04N 21/4334 370/474 |
| 2011/0162021 A1 | 6/2011 | Lee |
| 2016/0294714 A1* | 10/2016 | Persson .................. H04L 47/25 |
| 2017/0111670 A1 | 4/2017 | Ducloux |

* cited by examiner

SIGN LANGUAGE VIDEO ENCODING FOR DIGITAL CINEMA

CROSS-REFERENCE TO RELATED APPLICATIONS

This application is a U.S. national phase application, which is based on, and claims priority from, PCT application Serial No. PCT/US2019/014050, filed Jan. 17, 2019, which claims benefit of U.S. Provisional Patent Application No. 62/618,449, entitled "SIGN LANGUAGE VIDEO ENCODING FOR DIGITAL CINEMA," by Michael A. Radford, filed Jan. 17, 2018, which applications are hereby incorporated by reference herein.

BACKGROUND

1. Field

The present disclosure relates to systems and methods for encoding and packaging audiovisual content, and in particular to a system and method for encoding and packaging of a sign language video track in a digital cinema system.

2. Description of the Related Art

Since the introduction of movies having sound more than eighty years ago, people with a hearing loss have been faced with an access disparity that still exists today.

Captioning is the process of converting the audio portion of a film, video, CD-ROM, or other production into text which is displayed on a screen or monitor. Captions not only display words to indicate spoken dialogue or narration, but also include text based sounds, sound effects, speaker identification, music, and other auditory information not conveyed in speech.

Not all movies are captioned in the same way, and terminology to describe the types of captioning varies. In movie theaters, open captions consist of those requiring no manipulation or interaction by the viewing audience, because the captions are viewable on the screen with no special equipment or adjustment required by the audience. Closed captions in theaters uses captions that can only be seen by a person with the necessary equipment, typically provided by the theater at no charge.

There are several captioning techniques for theatrical releases. One technique known as REAR WINDOW CAPTIONING presents an image with the captioning to the rear of the viewer. The captioning can be viewed by the user using a reflective plastic panel mounted on a flexible stalk that is inserted into the cupholder of the viewer's seat. Another technique is the USL closed captioning system, which uses single infrared emitter to transmit closed caption text and two channels of audio into the theater. Receivers in the theater (seat or eyeglass mounted) permit viewers to see the closed captioning information.

While closed captioning is helpful, it is not optimal for a number of reasons. First, it is only helpful to those who are able to read. Second, closed captioning often fails to convey the emotional payload that typically part of any movie, such as sadness, fright or surprise.

Signing languages are superior to closed captioning in the foregoing respects. Signing languages are understood by the illiterate and can convey emotional payloads by gestures and facial expressions performed by the signer. Accordingly, some countries, such as Brazil, have mandated that signing language information be presented in theaters to those who need it. Further, different signing languages are presented in different geopolitical areas. For example, Brazil embraces the LIBRAS signing language, while American Sign Language (ASL) is the standard in the United States. What is needed is a system and method for providing such signing language information in theaters without requiring changes to the digital cinema equipment currently used in such venues.

SUMMARY

To address the requirements described above, this document discloses a system and method for providing a digital cinema package having variable rate auxiliary video data in a digital cinema package having primary video information and primary audio information carried on a plurality of fixed bit rate primary audio channels, each fixed bit rate primary audio channel comprised of audio samples. In one embodiment, the method comprises generating a plurality of chunks of the auxiliary video data, each chunk representing a time duration D of a respective portion of the auxiliary video data, generating a plurality of auxiliary video data blocks, each auxiliary video data block of $L_b$ length; and providing the auxiliary video data blocks in the at least one of the fixed bit rate primary audio channels. In one embodiment, each of the auxiliary video data blocks comprises the respective chunk of the auxiliary video data, a respective auxiliary video data block header of length $L_b$, the video chunk header, and null padding extending the generated auxiliary video data block to the length $L_b$. The video data block header describes a length $L_e$ of the respective chunk of the auxiliary video data and a length $L_e$ of a video chunk header. Other embodiments are evidenced by one or more processors executing processor instructions stored in a communicatively coupled memory that perform the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized, and structural changes may be made without departing from the scope of the present disclosure.

Overview

A system and method for the encoding and packaging of auxiliary video data such as a sign language video track within a digital cinema package for distribution and exhibition is presented below. The disclosed system encodes die sign language video track into chunks at a maximum bit rate that is small enough to place the completed chunks within unused audio channels in the digital cinema package. The carriage of video information in an audio channel is made possible because of the confluence of a number of factors. First, the digital cinema standard makes provision for up to 16 audio channels, most of which are rarely used, thus freeing one or more channels for carrying additional information. Second, digital cinema standards specify that each channel of audio information is conveyed in uncompressed form, so the bit rate each audio channel is relatively high. Third, the video information transmitted on such audio channels can be of reasonably low resolution, and comprise content that is easily and substantially compressed. For example, auxiliary video data having a person wearing simple clothes signing against a solid, uncomplicated and unchanging background can be substantially compressed.

This results in several benefits. First, it provides the sign language video track while remaining compatible with all existing Digital Cinema projection systems. Second, the disclosed technique supports random playback because the resulting blocks of auxiliary video data are inherently synchronized with audio at the output of the media block. Thus, no external synchronization is required between projector and mobile playback device presenting the auxiliary video data to the user. The technique also supports secure delivery with standardized encryption and decryption techniques supported by digital cinema systems. Further, the auxiliary video data is packaged with the audio DCDM elements, so all of the required files are included in the DCP 110. Decoding of the video track may be performed internal to or external to the media block.

Digital Cinema System

Figure 1A:
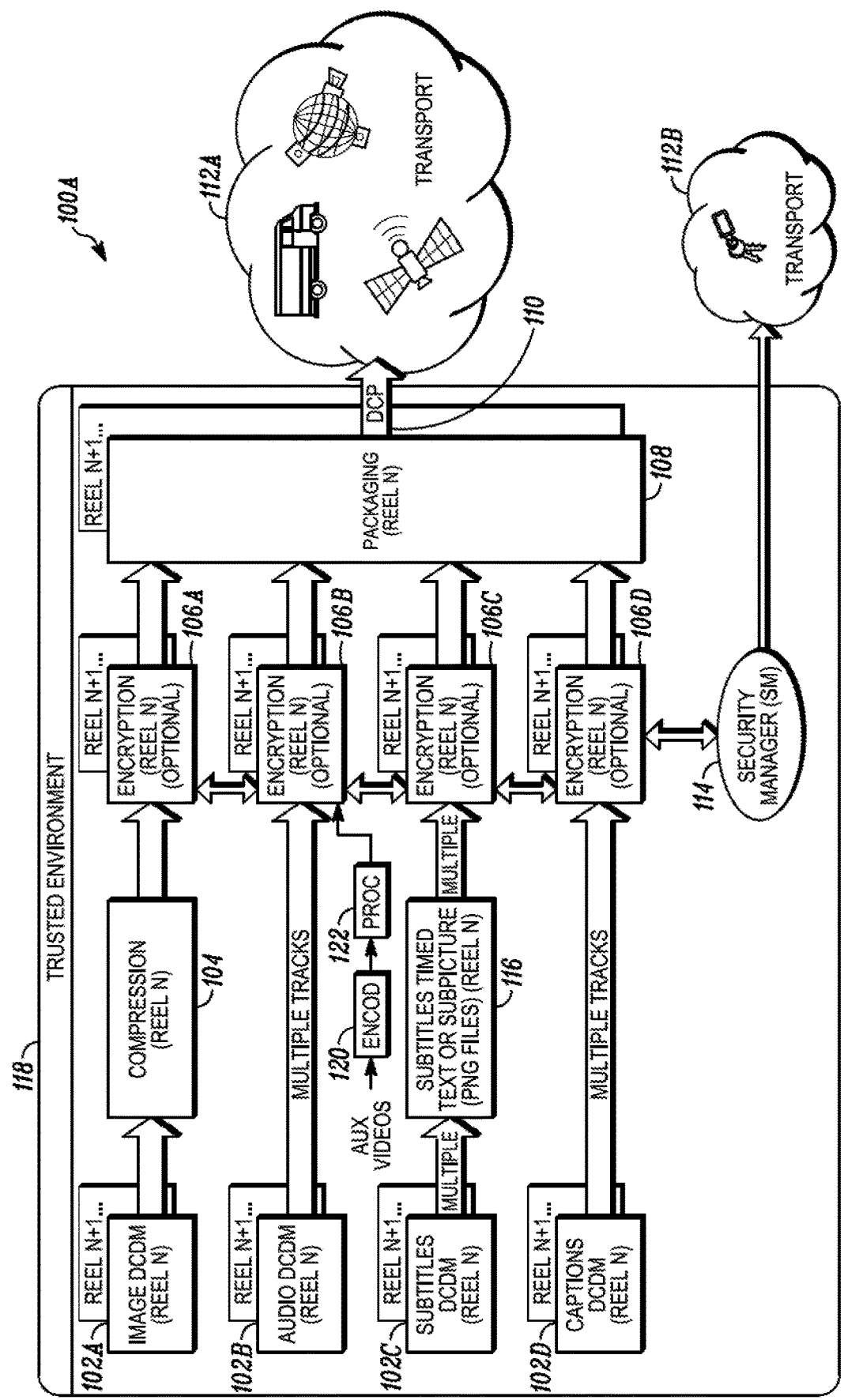
FIGS. 1A and 1B are diagrams depicting a Digital Cinema System.
Figure 1B:
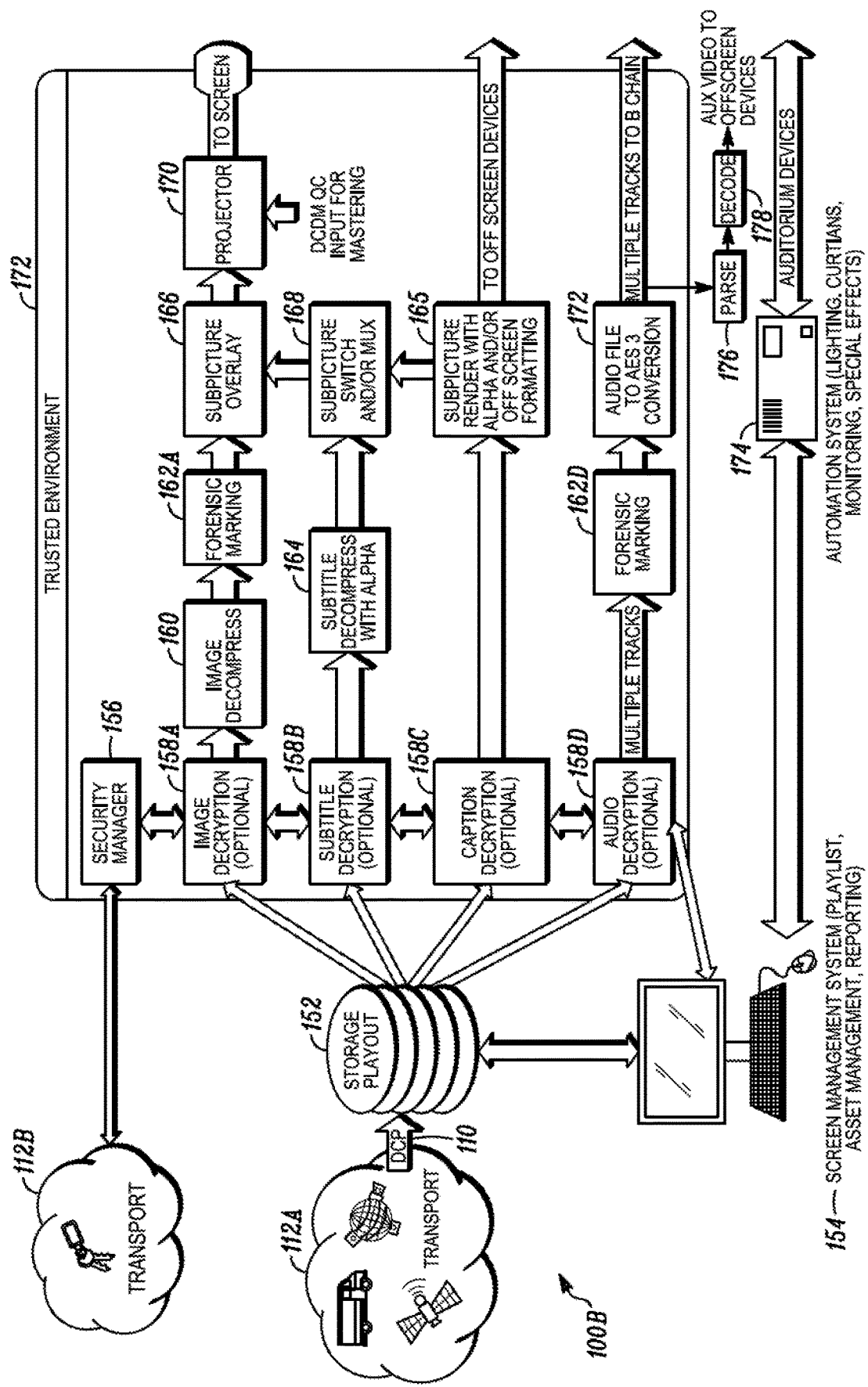

FIGS. 1A and 1B are diagrams depicting a Digital Cinema System (DCS). FIG. 1A depicts the generation segment 100A of the DCS 100, which generates a digital cinema package (DCP) 110 that is provided to exhibitors so that the content may be presented. FIG. 1B depicts the presentation segment 100B of the DCS 100, which processes the DCP 110 to present the content to persons in the theater.

In digital cinema parlance, a "composition" comprises all of the essence (audio, pictures, and subtitles) and metadata required for a single presentation of a feature, or a trailer, or an advertisement, or a logo to create a presentation using a digital system. Composition playlists (CPLs) are textual lists that define how elements of digital cinema compositions are played back in a presentation and what track files are required. The content owner creates the CPL in a post-production environment. For encrypted essence, the CPL is digitally signed so that modifications to the CPL (and/or the associated composition) can be detected.

A Digital Source Master (DSM) is created in post-production and is converted into a Digital Cinema Distribution Master (DCDM). The DSM can also be used to convert to a film duplication master, a home video master, and/or a master for archival purposes. The content could come from a wide range of sources with a wide range of technical levels.

The DCDM is the output of the digital cinema post-production process (in contrast to the feature post-production process, which creates the DSM) and is the image structure, audio structure, subtitle structure. These structures are mapped into data file formats that make up the DCDM.

Once the DCDM is compressed, encrypted and packaged for distribution, it is considered to be the Digital Cinema Package or DCP 110. This term is used to distinguish the package from the raw collection of files known as the DCDM. When the DCP 110 arrives at the theater, it is eventually unpackaged, decrypted and decompressed to create the DCDM*, where DCDM* image is visually indistinguishable from the original DCDM image.

The DCS generation segment 100A operates in a trusted environment 118 and includes a digital cinema distribution master (DCDM) element having DCDM elements 102A-102D, a compression element, a packaging element, and a transport element. The DCS presentation segment 100B includes a theater element, a projection element and a security element.

The DCDM elements 102A-102D comprise the uncompressed, unencrypted file or set of files containing the content and its associated data. The DCDM elements 102A-102D include a video DCDM element 102A, an audio DCDM element 102B, a subtitle DCDM element 102C and a caption DCDM element 102D.

Compression module 104 reduces redundancy in the image (video content or source essence data) by utilizing compression techniques well known in the art. This compression is reversed to recover the content at the theater. Audio DCDM elements 102B, subtitle DCDM elements 102C and caption DCDM elements 102D are not typically compressed.

The encryption elements 106A-106D optionally (but typically) encrypt DCDM elements 102. Prior to encryption, subtitle DCDM elements 102C may be processed by subtitle processor 116 to create timed text or subpictures.

The packaging element 108 packages the compressed and encrypted DCDM elements 102A-102D into a DCP 110 for distribution. The transport element 112 includes a first transport element 112A used to distribute the DCP 110 and a second transport element 112B used to distribute content keys and other information required to consume the content of the DCP 110. Typically, such keys and other security information are generated by security manager 114 and are provided only on demand and when the content is exhibited. In one embodiment, such keys are provided in a key delivery message (KDM).

Turning now to FIG. 1B, the presentation segment 100B includes a storage playout element 152 that stores the DCP 110 and provides portions of the DCP 110 to the processing element 112 as directed by the screen management system 154. The processing element includes a security manager 156, that controls decryption, forensic marking and logging using the keys provided by second transport element 112B. Decryption elements 158A-158D decrypt the information from the video DCDM element 102A, an audio DCDM element 102B, a subtitle DCDM element 102C and a caption DCDM element 102D, respectively. The decrypted video DCDM element is provided to image decompressor 160 to decompress the images in the content. Subtitles are decrypted with processing element 164. The decompressed video is provided to a forensic marking module 162A to watermark the decompressed video, typically using steganographic techniques. Similarly, the decrypted (it typically uncompressed) audio DCDM element 158D is forensically marked. As further described below, provision is made for preventing such forensic marking in some of the audio channels. Converter element 172 converts the uncompressed and now decrypted PCM audio files to a plurality of AES3 data streams, one for each channel of audio (of which there are 16). Captions from the caption DCDM element 158C may be provided to subpicture rendering element 165, and thence wirelessly to off screen devices, for example, closed captioning devices within the theater, which are provided to viewers upon request. Such rendered captions may also be provided for projection via subpicture overlay element 166 as controlled by switch 168. The forensically marked video DCDM element is then provided to projector 170 to be presented on a screen of the theater. The screen management system 154 also controls an automation system 174 which can be used to control theater devices such as lighting and curtains.

The DCS generation segment 100A and DCS presentation segment 100B include additional elements that permit the transfer of auxiliary video information without modification to the respective segments. The DCS generation segment 100A includes an encoder 120 that accepts digitized auxiliary video and encodes it using a data compression scheme such as VP9 (an open and royalty-free video coding format developed by GOOGLE) or MPEG (Moving Pictures Experts Group) and generates chunks of auxiliary video data therefrom. A processor 122 then generates data blocks that include the chunks of auxiliary data, adding metadata that permits the chunk of auxiliary data to be recovered and processed by the presentation segment 100B. A parser 176 in the presentation segment 100B parses the data stream to identify and retrieve the auxiliary video data blocks from at least one of the tracks normally used to carry audio information, parses the blocks according to the metadata, and provides the chunk of auxiliary video data to a decoder 178. The decoder 178 decodes the auxiliary data, to recreate the uncompressed video information, which is sent to devices that present the video to users within the theater.

DCP Audio

The DCS paradigm, atomic units of information (both video and audio) are known as "edit units" that are analogous to "frames" of ordinary video. The distinction allows, for example, two frames of video of a 3D presentation to be an edit unit, even though they are provided sequentially because both frames are required to present the 3D image. We now describe a method for mapping the above video bitstream into a digital audio channel for inclusion in a DCP 110.

DCPs 110 carry audio as a sequence of uncompressed frames of (up to) 16 channels of 24-bit Pulse-Code Modulation (PCM). The PCM may have a sample rate of 48 kHz or 96 kHz, but 48 kHz is more typical. Each audio frame has a duration:

duration=1/$e$ where $e$ is edit rate of the composition (analogous to the frame rate of ordinary video). The edit rate is typically 24 edit units per second or more. Hence, the duration of each audio frame is typically 1/24 second.

During playback, projection systems sequentially decrypt each edit unit (hereinafter alternatively referred to as "frame") of audio and output each of its channels to their corresponding AES3 digital output to form 16 independent channels having digital audio streams. Each of these 16 digital streams is therefore operating at the following fixed bitrate:

48000 samples/s*24 bit/sample=1.152 Mb/s.

Since the audio information is uncompressed, the foregoing bitrate is constant throughout the media program, regardless of complexity. Carrying auxiliary video information in one of these audio channels presents two challenges. First, video data is typically very large and must be compressed for efficient transfer, especially if such video data is to be carried on channels designed for audio, which typically support only relatively low bit rates. Second, most video code compression schemes (including MPEG and VP9) are codecs providing compressed video output that is highly variable in bit rate.

To permit the carriage of variable bit rate video in fixed bit rate digital audio channel, and to allow for operator-initiated timeline jumps (i.e., "trick play"), the auxiliary video data is encoded into discrete chunks that get distributed evenly throughout the digital audio program. Each chunk contains both an extensible binary meta language (EBML) header and auxiliary video segment or chunk. The EBML header specifies a binary and byte aligned format that is agnostic to any data that it contains. EBML generally defines the following data types.

Signed Integer—Big-endian, any size from 1 to 8 octets
Unsigned Integer—Big-endian, any size from 1 to 8 octets
Float—Big-endian, defined for 4 and 8 octets (32, 64 bits)
String—Printable ASCII (0x20 to 0x7E), zero-padded when needed
UTF-8—Unicode string, zero padded when needed (RFC 2279)
Date—signed 8 octets integer in nanoseconds with 0 indicating the precise beginning of the millennium (at 2001-01-01T00:00:00,000000000 UTC)
Master-Element—contains other EBML sub-elements of the next lower level
Binary—not interpreted by the parser The time duration $D_c$ of each auxiliary video chunk is chosen to substantially synchronize the auxiliary video data with the primary video data of the DCP 110. Since the information in the audio channels is inherently synchronized with the primary video information of the media program, placing auxiliary video information in the audio channels results the auxiliary video information being synchronized as well. The precision by which such synchronization is accomplished depends on the time duration of each video chunk. For example, the time duration $D_c$ of 2 seconds guarantees that the auxiliary video information will be no further than 2 seconds out of synchronization with the primary video information. This precision is shown to be adequate for purposes of auxiliary video information carrying signing language.

Two seconds of audio data is equivalent to approximately 288 Kbytes of information, as described below:

$L_b$=48,000 samples/s·3 bytes/sample·$D_c$=288,000 bytes

Hence, a block of video data of lengths $L_b$ can be presented every 2 seconds. This block must include metadata in the form of block overhead such as headers that permits the video data to be identified and processed. Further, as described below, since the actual length of the video data is variable, null data is included to pad the block of video data to length $L_b$.

Creating DCPs with Auxiliary Video Data

Figure 2:
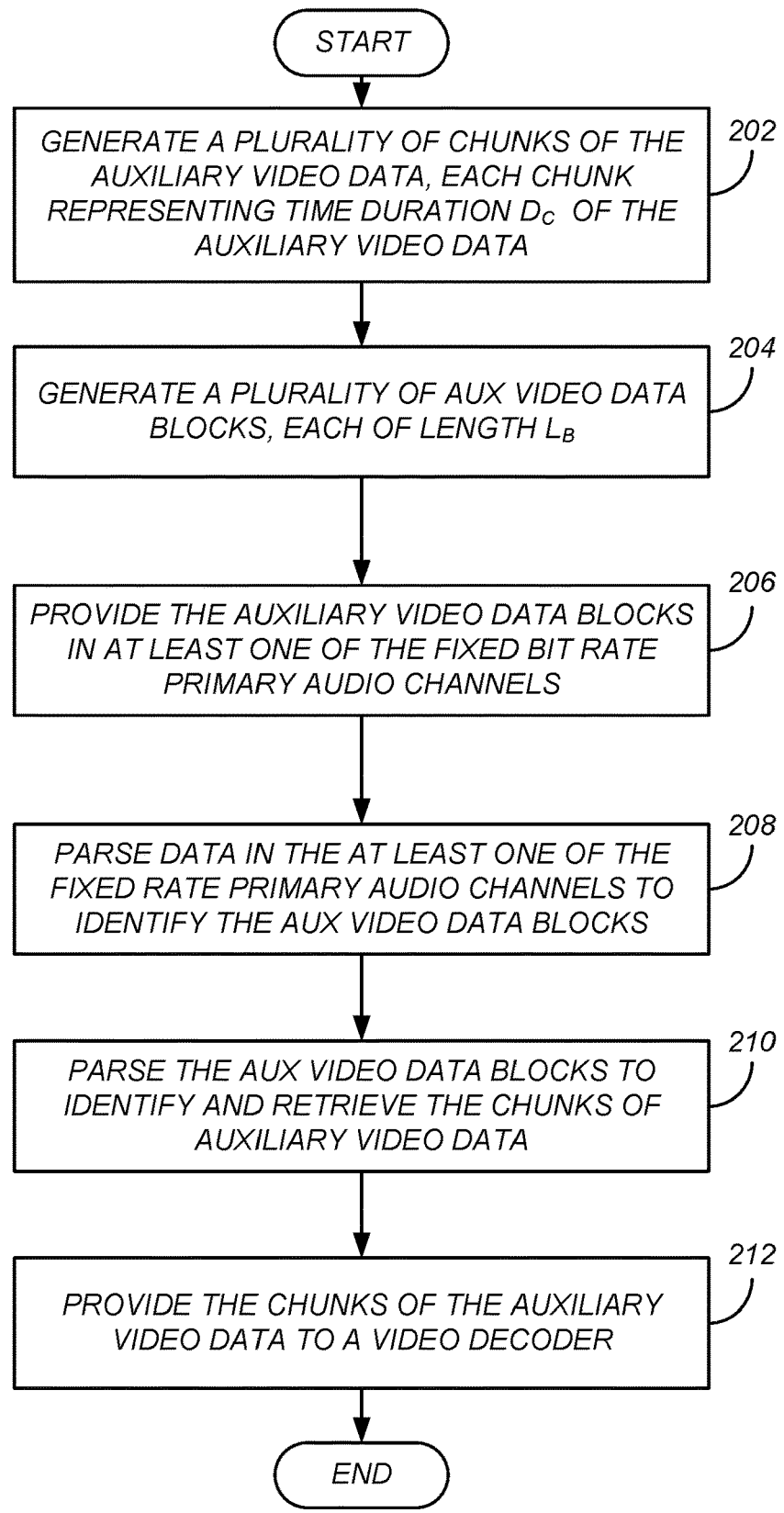
FIG. 2 is a diagram illustrating one embodiment of a process for providing variable rate auxiliary video data in a DCP.

FIG. 2 is a diagram illustrating one embodiment of a process for providing variable rate auxiliary video data in a DCP 110. As described above, the DCP 110 comprises primary video information (e.g. the video portion of the content) and primary audio information (e.g. the audio portion of the content). The audio portion of the content is carried on a plurality of fixed bit rate primary audio channels, each fixed bit rate primary audio channel represented by a sequence of audio channel frames. In block 202, a plurality of chunks of the auxiliary video data is generated. Each chunk represents a time duration of an associated portion of the auxiliary video data of $D_c$ seconds.

Figure 3:
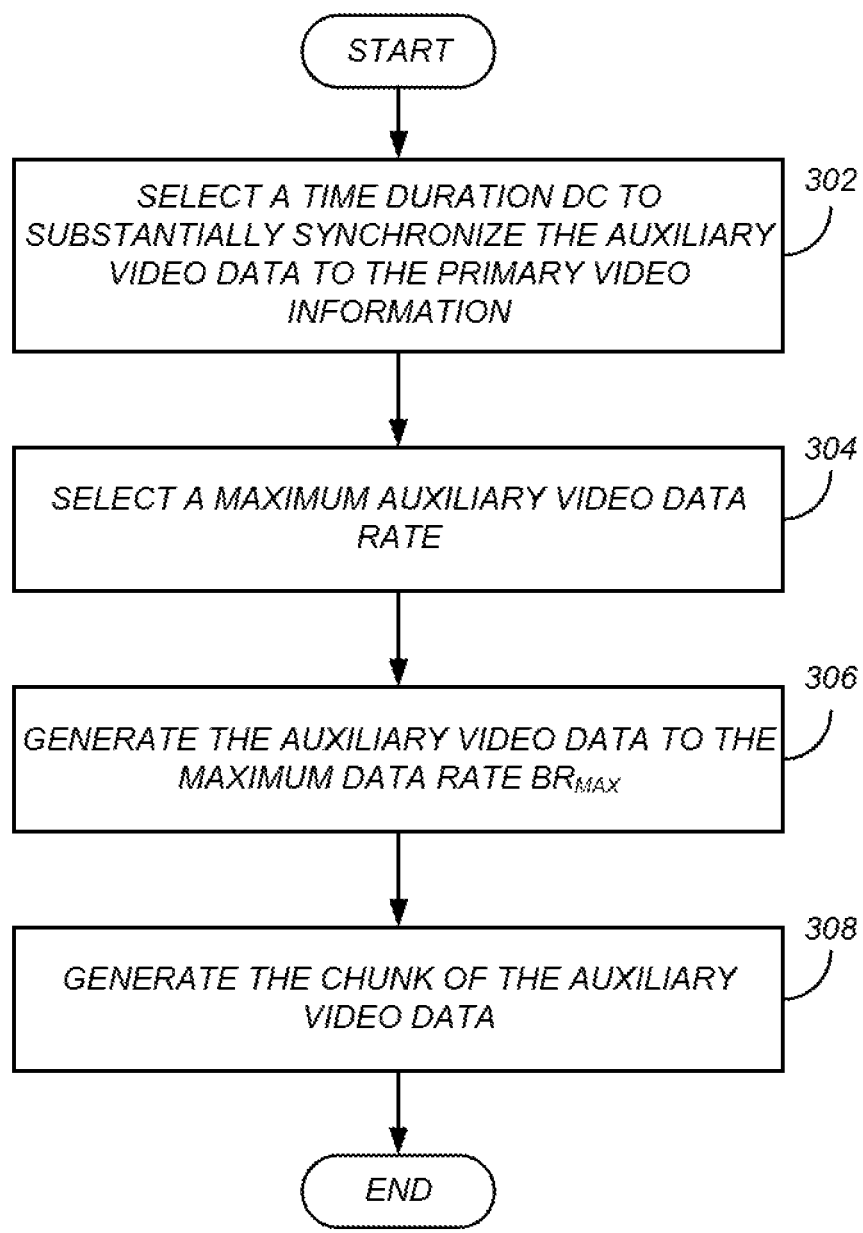
FIG. 3 is a diagram illustrating exemplary process steps for generating the chunk of auxiliary video data.

FIG. 3 is a diagram illustrating exemplary process steps for generating the chunks of auxiliary video data. Raw (uncompressed) video is provided to a video encoder 120 implementing a suitable codec (code/decode) paradigm such as VP9, an open source royalty free video coding format developed by GOOGLE. In one embodiment, the raw video comprises a video representation of at least a portion of the primary audio information in a signing language such as ASL or LIBRAS.

The video encoder 120 produces a coded (compressed) video of a selectable resolution, frame rate, maximum bit rate, color space, and pixel format. In one embodiment, the selected resolution is 480×640 pixels in a portrait orientation, the video frame rate is 24 frames per second (regardless of the frame rate of the primary video information), the color space for encoding is selected as Y'UV, and the pixel format uses Y'UV420p sub-sampling.

In block 302, the time duration $D_c$ is selected to substantially synchronize the auxiliary video data to the primary video information. As described above, an acceptable chunk time duration for use with signing video is approximately 2 seconds. Longer or shorter chunk durations may be selected. In block 304, a maximum video data rate $BR_{max}$ is selected. This selection is further described below. In block 306, the auxiliary video data is generated according to the maximum video data rate $BR_{max}$. Finally, the chunk of data is generated from the auxiliary video data, as shown in block 308.

Returning to FIG. 2, block 204 generates a plurality of auxiliary video data blocks 402, each of length $L_b$ bytes.

Figure 4:
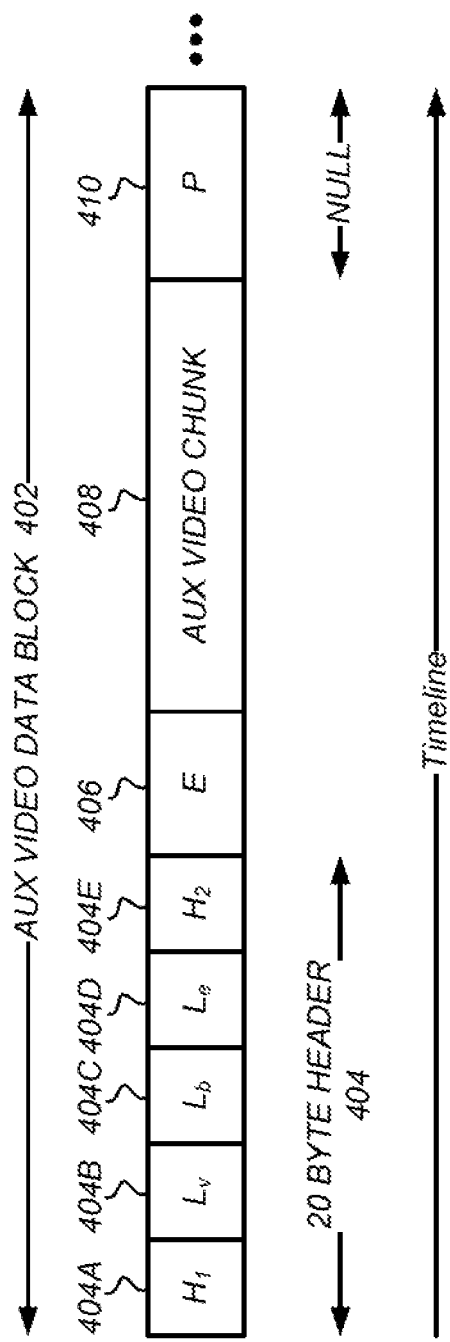
FIG. 4 is a diagram illustrating an illustrative embodiment of the auxiliary video data block.

FIG. 4 is a diagram illustrating an illustrative embodiment of the auxiliary video data block 402. The auxiliary video data block 402 is of length $L_b$ and comprises metadata comprising an auxiliary video data block header 404 of length $L_b$ and a video chunk header 406 of length $L_e$, and a chunk of auxiliary video data 408 that is of variable length $L_v$. The auxiliary video data block 402 also comprises null padding 410 that extends the generated auxiliary video data block 402 length of $L_b$=48,000 samples/s·3 bytes/sample·$D_c$=288,000 bytes. In the illustrated embodiment, die length of this sequence of null bytes 410 is $L_b$-$L_v$-$L_e$-$L_h$ bytes, where $L_v$ is the length of the chunk of auxiliary video data 408 in bytes, $L_b$ is the length of auxiliary video data block 402) in bytes, and $L_e$ is the length of video chunk header 406 (in the illustrated example, a VP9 EBML header) in bytes.

In the illustrated embodiment, the auxiliary video data block header 404 is 20 bytes in length, but other lengths are also possible. The auxiliary video data block header 404 includes a first segment 404A having a data value $H_1$=0xFFFFFFFF used to signal the beginning of the auxiliary video data block header 404, a second segment 404B having a data value $L_c$ (the length of the chunk of auxiliary video data 408 in bytes represented by a 22-bit unsigned integer (big-endian)), a third segment 404C having a data value $L_b$ (the length of the auxiliary video data block 402 in bytes represented by a 32-bit unsigned integer (big-endian)), a fourth segment 404D having a data value $L_e$ (the length of the video chunk header 406 in bytes represented by a 32-bit unsigned integer, big-endian), and a fifth segment 404E having a data value $H_2$=0xFFFFFFFF used to signal the end of the auxiliary video data block header 404.

The auxiliary video data blocks 402 are generated by a processor 122 that concatenates the foregoing data structures (e.g. the auxiliary video data block header 404, video chunk header 406, chunk of auxiliary video data 408, and null padding 410) into each respective auxiliary video data block 402. The order of the data structures is not important, so long as the entity receiving the auxiliary video data block 402 is aware of the order of the structures, so the information contained therein can be successfully parsed and recovered.

The length of the auxiliary video data block 402 $L_b$ is determined at least in part by the length of the chunk of the auxiliary video data 408 (which is determined by the duration of the chunk duration $D_c$ and the maximum bit rate $BR_{max}$ of the data the encoder) and the length of the overhead metadata (e.g. header lengths $L_h$ and $L_e$) required to parse and process that auxiliary video data block 402. Hence the auxiliary video should be coded according to a fixed bit rate according to the following relationship:

$$BR_{max} \leq \frac{L_b - L_h - L_e}{D_c}.$$

This relationship can be used to determine the selected maximum auxiliary video data rate $BR_{max}$ (the bit rate of video data emanating from the encoder 120) described in block 304 of FIG. 3. For example, if the audio channel is sampled at 48 kHz and is sampled to a 24 bit depth, this indicates that the audio stream has a bit rate of 1.152 Mbits per second. If the video encoder were set to encode the video at a maximum video rate of 1.152 Mbits per second, there would be little or no room for overhead (e.g. headers and the like) in the auxiliary video data block 402. To account for this, the maximum video rate of the video encoder is instead set to a number no larger than indicated in the above equation, for example, 1.0 Mbits per second.

Returning to FIG. 2, the auxiliary video data block 402 is provided as audio channel data of one of fixed bit rate primary audio channels, as shown in block 206. In one embodiment, the DCP 110 is compliant with the "Digital Cinema System Specification Version 1.3," 27 Jun. 2018, by Digital Cinema Initiatives, LLC, Member Representatives Committee (hereby incorporated by reference herein) and comprises 16 channels of audio information, and the auxiliary video data block 302 is provided as a part of channel 15 of the 16 channels. The foregoing process is repeated for multiple edit units of the DCP 110, hence, a plurality of auxiliary video data blocks 402 are included in the DCP 110. If desired the naming convention of the main sound track file of the DCP 110 may add "SL" to not the presence of the sign language video in the DCP 110.

As described above, there are at least two major signing language conventions: Brazilian Sign Language (BSL), also known as LIBRAS and American Sign Language (ASL). Since two of the 16 channels of audio information are unused, both signing language conventions may be carried in the DCP 110, one on channel 15 and the other on channel 16.

SMPTE DCP Handling

SMPTE (Society of Motion Pictures and Television Engineers) DCP is specific implementation of the DCP that permits features over and above standard DCPs 110. Such features include MXF wrapping and encryption of subtitle tracks, multiple subtitle fonts, 3D Subtitle rendering via XML Timed Text/PNGs, immersive audio formats, a greater range of frame rates (eg 16-120 fps), high dynamic range images, multi screen representations, CPL metadata for readability and asset management, CPL markers for theatre automation and MCA—multi channel audio routing. For SMPTE DCPs 110 that carry auxiliary sign language video such as LIBRAS, the composition playlist or CPL associated with the DCP 110 indicates the presence of this track using CPL metadata, in accordance with SMPTE ST 429-26 (hereby incorporated by reference herein). CPL metadata permits extension elements that can be used within the ExtensionMetadataList element defined in the SMPTE DCP 110. A representative extension element is presented below:

```
<ExtensionMetadata scope="http://isdcf.com/2017/10/
SignLanguageVideo">
    <Name>Sign Language Video</Name>
    <PropertyList>
        <Property>
            <Name>Language Tag</Name>
            <Value>DESCRIPTION</Value>
        </Property>
    </PropertyList>
</ExtensionMetadata>
``` where "DESCRIPTION" is a language tag that identifies the sign language present in the sign language video track presented by the auxiliary video data blocks 402. In one embodiment, the language tag is consistent with RFC 5646 (hereby incorporated by reference herein).

For track files using multi channel audio routing (MCA), the items of the audio channel label subdescriptor associated with the sign language video are set as shown in Table I below:

TABLE I

| MCA Label Dictionary ID | MCA Tag Name | MCA Tag Symbol | RFC 5646 Spoken Language |
|---|---|---|---|
| 06.0E.2B.34.04.??.??.??.??.??.??.??.??.??.??.?? | Sign Language Video Stream | SLVS | Same as the Soundfield Group Label Sub Descriptor |

Presenting Auxiliary Video Data

The DCP 110 is provided from the generation segment 100A to the presentation segment 100B, and processed as described above. Parser 176 retrieves data from the appropriate channel or track of the AES3 stream (e.g. channel 15), and parses the data to identify the auxiliary video data block, as shown in block 208 of FIG. 3. As described below, the channel or track in which the auxiliary video data blocks 402 are presented may be configurable and indicated using an identifier in the KDM such as the same flag that selectively prohibits forensic marking.

The parser 176 then parses retrieved auxiliary video data blocks 402 to retrieve the overhead information (e.g. the auxiliary video data block header 404), and uses the overhead information to identify and retrieve the chunks of the auxiliary video data 408, as shown in block 210. Finally, the identified chunk of the auxiliary video data 408 is provided to a video decoder 178. The video decoder 178 decodes the identified chunk of the auxiliary video data, and provides the decoded chunk of the auxiliary video data for display, as shown in block 212. The process is repeated for all received auxiliary video data blocks.

Decoders 178 should not expect that all data presented to it on channel-15 conforms to the block structure outlined in FIG. 4. Not all compositions that contain essence on channel 15 will carry video as defined in this document. Some may contain silence, or other audio essence. Additionally, those compositions that do carry sign language video, may not carry valid blocks throughout the entire timeline. Therefore, a robust parser 176 should continually scan its incoming stream for data that resembles a valid header, and data that does not resemble a valid header should be ignored.

Forensic Marking

As described above, audio data is typically forensically marked by the forensic marking module 162D before being converted into the AES3 stream and provided to the audio system of the theater. Such marketing inserts a watermark or similar artifice within audio stream so that if copies are made of the audio stream, information about such copying (e.g. in which theater it was copied and when) can be ascertained and used to prevent further copying. Such forensic marking, when applied to audio data, is specified so as to be inaudible persons within the theater. However, if the same forensic marking techniques are applied to video data, particularly compressed video data, such forensic marking will typically result in visible artifacts in the decoded auxiliary video. In one embodiment, this is avoided by modifying the presentation segment 100B to forensically mark the auxiliary video data blocks 402 differently (analogously to the forensic marking of the video performed by forensic marking module 162A). In another embodiment, the forensic marking of the auxiliary video is instead simply prevented by use of an identifier a flag or similar artifice in the DCP 110 or in the key delivery message (KDM).

The Digital Cinema System Specification referenced above describes a selective audio forensic marking (FM) flag that can be used to independently control the activation of both the audio and image forensic marking. The flag is included only in the KDM, thus vesting control of forensic marking to the provider of the content instead of the exhibitor. Typically, forensic marking is not applied non-encrypted content, including non-encrypted primary audio information and non-encrypted primary video information. Hence, if the primary audio channels are not encrypted, forensic marking of information in the audio channels will not take place, and the auxiliary video information will not be forensically marked. However, if the primary audio information is encrypted (typically the case), forensic marking is applied unless otherwise indicated by the KDM. The Digital Cinema System Specification describes a "no FM mark" and "selective audio FM mark" state that commanded by the 'ForensicMarkFlagList' element of the KDM. When the KDM 'ForensiccMarkFlagList' indicates the "no FM mark" command, the FM device(s) shall enter a full bypass mode, and shall not alter the content essence for the associated encrypted DCP. When the KDM 'ForensicMarkFlagList' indicates the "selective audio FM mark" command, (indicated by the presence of a ForensiclarkFlag element containing a URI of the form: "http://www.dcimovies.com/430-1/2006/KDM#mrkflg-audio-disable-above-channel-XX", the audio channels or tracks above XX are not forensically marked.

The value chosen for XX depends on which channels are desired to be presented without forensic marking. Typical formats include six channel (5.1) and eight channel (7.1) audio formats, and channels 15 and 16 are not currently used to convey any information. Accordingly, if XX is set to a value less than or equal to 14, channels 15 and 16 will not be forensically marked. When targeting a composition containing motion data and an external sync signal in addition to the auxiliary video content, the XX is set to a value smaller than or equal to 12.

Hardware Environment

Figure 5:
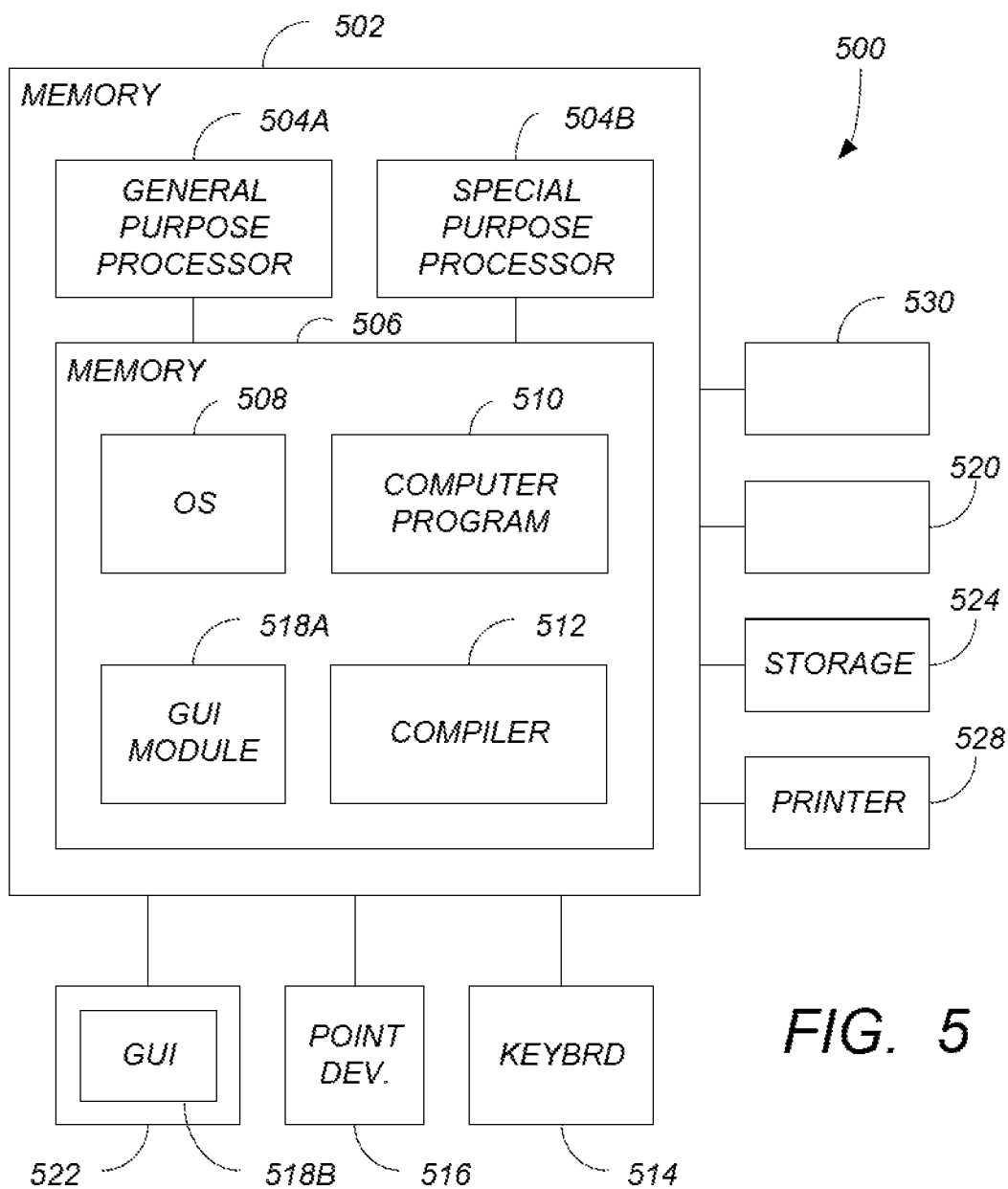
FIG. 5 illustrates an exemplary computer system that could be used to implement processing elements of the sign language video encoding system.

FIG. 5 illustrates an exemplary computer system 500 that could be used to implement processing elements of the above disclosure, including the compression element, encoder element 120, processing element 122, encryption elements 106A-106D, security manager 114, packaging element 108, storage playout 152, screen management system 154, security manager 156 decryption elements 158A-158D, image decompressor 160, forensic marking modules 162A and 162D, converter 172, parser 176, decoder 178, sub-picture overlay 166, and projector 170. The computer 502 comprises a processor 504 and a memory, such as random access memory (RAM) 506. The computer 502 is operatively coupled to a display 522, which presents images such as windows to the user on a graphical user interface 518B. The computer 502 may be coupled to other devices, such as a keyboard 514, a mouse device 516, a printer 528, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518B is depicted as a separate module, the instructions performing the GUI functions can be resident or distributed in the operating system 508, the computer program 510, or implemented with special purpose memory and processors. The computer 502 also implements a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that was generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the operations herein described. Computer program 510 and/or operating instructions may also be tangibly embodied in memory 506 and/or data communications devices 530, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing a variable rate auxiliary video data in a digital cinema package having a primary video information and a primary audio information, the primary audio information carried on a plurality of fixed bit rate primary audio channels, the method comprising:
   generating a plurality of chunks of the variable rate auxiliary video data, each chunk of the plurality of chunks representing a time duration $D_c$ of a respective portion of the variable rate auxiliary video data;
   generating a plurality of auxiliary video data blocks, each auxiliary video data block of the plurality of auxiliary video data blocks having a length $L_b$ and comprising:
      a respective chunk of the plurality of chunks of the variable rate auxiliary video data;
      a respective auxiliary video data block header having a length $L_h$ and describing:
         a length $L_v$ of the respective chunk of the variable rate auxiliary video data;
         a length $L_e$ of a video chunk header;
      the video chunk header;
      null padding extending each of the generated plurality of auxiliary video data blocks to the length $L_b$; and
   providing the generated plurality of auxiliary video data blocks in at least one of the plurality of fixed bit rate primary audio channels;
   wherein the digital cinema package comprises a composition playlist metadata, and wherein the composition playlist metadata comprise an extension metadata list element having a language tag identifying a signing language.

2. The method of claim 1, wherein generating the plurality of chunks of the variable rate auxiliary video data comprises:
selecting the time duration $D_c$ to substantially synchronize the variable rate auxiliary video data to the primary video information;
selecting a maximum auxiliary video data rate $BR_{max}$ according to:

$$BR_{max} \leq \frac{L_b - L_h - L_e}{D_c};$$

generating the variable rate auxiliary video data according to the maximum auxiliary video data rate $BR_{max}$; and
generating the plurality of chunks of the variable rate auxiliary video data.

3. The method of claim 1, wherein:
the variable rate auxiliary video data comprises a video representation of at least a portion of the primary audio information in the signing language.

4. The method of claim 1, wherein:
the digital cinema package comprises an SMPTE (Society of Motion Pictures and Television Engineers) digital cinema package.

5. A method of providing a variable rate auxiliary video data in a digital cinema package having a primary video information and a primary audio information, the primary audio information carried on a plurality of fixed bit rate primary audio channels, the primary video information and the primary audio information are encrypted according to at least one content key, the method comprising:
generating a plurality of chunks of the variable rate auxiliary video data, each chunk of the plurality of chunks representing a time duration $D_c$ of a respective portion of the variable rate auxiliary video data;
generating a plurality of auxiliary video data blocks, each auxiliary video data block of the plurality of auxiliary video data blocks having a length $L_b$ and comprising:
a respective chunk of the plurality of chunks of the variable rate auxiliary video data;
a respective auxiliary video data block header having a length $L_h$ and describing:
a length $L_v$ of the respective chunk of the variable rate auxiliary video data;
a length $L_e$ of a video chunk header;
the video chunk header;
null padding extending each of the generated plurality of auxiliary video data blocks to the length $L_b$;
providing the generated plurality of auxiliary video data blocks in at least one of the plurality of fixed bit rate primary audio channels;
generating a key delivery message, the key delivery message including the at least one content key, and an identifier indicating which of the plurality of fixed bit rate primary audio channels includes the plurality of auxiliary video data blocks.

6. The method of claim 5, wherein the identifier is a selective forensic marking flag.

7. The method of claim 5, wherein the plurality of chunks of the variable rate auxiliary video data are generated according to a VP9 standard.

8. The method of claim 1, further comprising:
parsing data in the at least one of the fixed bit rate primary audio channels to identify the plurality of auxiliary video data blocks;
parsing the plurality of auxiliary video data blocks to identify the plurality of chunks of the variable rate auxiliary video data; and
providing the identified plurality of chunks of the variable rate auxiliary video data to a video decoder.

9. The method of claim 8, further comprising:
decoding the identified plurality of chunks of the variable rate auxiliary video data; and
providing the decoded plurality of chunks of the variable rate auxiliary video data for display.

10. An apparatus configured to provide a variable rate auxiliary video data in a digital cinema package having a primary video information and a primary audio information, the primary audio information carried on a plurality of fixed bit rate primary audio channels, the apparatus comprising:
a processor;
a video encoder configured to generate a plurality of chunks of the variable rate auxiliary video data, each chunk of the plurality of chunks representing a time duration $D_c$, of a respective portion of the variable rate auxiliary video data;
a memory communicatively coupled to the processor, the memory storing processor instructions;
the processor configured to execute the processor instructions to:
generate a plurality of auxiliary video data blocks, each auxiliary video data block of the plurality of auxiliary video data blocks having a length $L_b$ and comprising:
a respective chunk of the plurality of chunks of the variable rate auxiliary video data;
a respective auxiliary video data block header having a length $L_h$ and describing:
a length $L_v$ of the respective chunk of the variable rate auxiliary video data;
a length $L_e$ of a video chunk header;
the video chunk header;
null padding extending the generated auxiliary video data block to the length $L_b$; and
provide the generated plurality of auxiliary video data blocks in at least one of the plurality of fixed bit rate primary audio channels:
wherein the digital cinema package comprises a composition playlist metadata, and wherein the composition playlist metadata comprise an extension metadata list element having a language tag identifying a signing language.

11. The apparatus of claim 10, wherein:
the video encoder is configured to generate each chunk of the plurality of chunks of the variable rate auxiliary video data by:
selecting the time duration $D_c$ to substantially synchronize the variable rate auxiliary video data to the primary video information;
selecting a maximum auxiliary video data rate $BR_{max}$ according to:

$$BR_{max} \leq \frac{L_b - L_h - L_e}{D_c};$$

generating the variable rate auxiliary video data according to the maximum auxiliary video data rate $BR_{max}$; and generating the plurality of chunks of the variable rate auxiliary video data.

12. The apparatus of claim 10, wherein:

the variable rate auxiliary video data comprises a video representation of the primary audio information in the signing language.

13. The apparatus of claim 10, wherein:

the digital cinema package comprises an SMPTE (Society of Motion Pictures and Television Engineers) digital cinema package.

14. An apparatus configured to provide a variable rate auxiliary video data in a digital cinema package having a primary video information and a primary audio information, the primary audio information carried on a plurality of fixed bit rate primary audio channels, the primary video information and the primary audio information are encrypted according to at least one content key, the apparatus comprising:

a processor;

a video encoder configured to generate a plurality of chunks of the variable rate auxiliary video data, each chunk of the plurality of chunks representing a time duration $D_c$ of a respective portion of the variable rate auxiliary video data;

a memory communicatively coupled to the processor, the memory storing processor instructions;

the processor configured to execute the processor instructions to:

generate a plurality of auxiliary video data blocks, each auxiliary video data block of the plurality of auxiliary video data blocks having a length $L_b$ and comprising:

a respective chunk of the plurality of chunks of the variable rate auxiliary video data;

a respective auxiliary video data block header having a length $L_h$ and describing:

a length $L_v$ of the respective chunk of the variable rate auxiliary video data;

a length $L_e$ of a video chunk header;

the video chunk header;

null padding extending the generated auxiliary video data block to the length $L_b$; and provide the generated plurality of auxiliary video data blocks in at least one of the plurality of fixed bit rate primary audio channels:

generate a key delivery message, the key delivery message including the at least one content key, and an identifier indicating which of the plurality of fixed bit rate primary audio channels includes the plurality of auxiliary video data blocks.

15. The apparatus of claim 14, wherein the identifier is a selective forensic marking flag.

16. The apparatus of claim 14, wherein the plurality of chunks of the variable rate auxiliary video data are generated according to a VP9 standard.

17. The apparatus of claim 10, wherein the processor is further configured to execute the processor instructions to:

parse data in the at least one of the fixed bit rate primary audio channels to identify the plurality of auxiliary video data blocks;

parse the plurality of auxiliary video data blocks to identify the plurality of chunks of the variable rate auxiliary video data; and provide the identified plurality of chunks of the variable rate auxiliary video data to a video decoder.

18. The apparatus of claim 17, further comprising the video decoder, wherein the video decoder is configured to:

decode the identified plurality of chunks of the variable rate auxiliary video data; and provide the decoded plurality of chunks of the variable rate auxiliary video data for display.

* * * * *